US012381045B2

(12) United States Patent
Kroeker et al.

(10) Patent No.: US 12,381,045 B2
(45) Date of Patent: Aug. 5, 2025

(54) SWITCHING CONTACT ASSEMBLY FOR AN ELECTRICAL SWITCHING ELEMENT AND ELECTRICAL SWITCHING ELEMENT

(71) Applicant: TE Connectivity Germany GmbH, Bensheim (DE)

(72) Inventors: Matthias Kroeker, Berlin (DE); Peter Sandeck, Berlin (DE); Harry Koch, Berlin (DE); Bernd Rahn, Berlin (DE); Fabian Habur, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/975,819

(22) Filed: Oct. 28, 2022

(65) Prior Publication Data

US 2023/0132857 A1 May 4, 2023

(30) Foreign Application Priority Data

Oct. 28, 2021 (DE) ......................... 102021128179.2

(51) Int. Cl.

*H01H 1/24* (2006.01)
*H01H 1/30* (2006.01)
*H01H 1/36* (2006.01)
*H01H 1/44* (2006.01)
*H01H 1/50* (2006.01)
*H01H 9/02* (2006.01)

(52) U.S. Cl.

CPC ................ *H01H 1/44* (2013.01); *H01H 1/24* (2013.01); *H01H 1/30* (2013.01); *H01H 1/365* (2013.01); *H01H 1/502* (2013.01); *H01H 9/02* (2013.01)

(58) Field of Classification Search

None
See application file for complete search history.

(56) References Cited

U.S. PATENT DOCUMENTS 1,838,664 A * 12/1931 Dubilier ................. H01H 71/18 337/140
2,384,988 A * 9/1945 Delbert .................... H01H 1/20 200/243
2,787,687 A * 4/1957 Hall ......................... H01H 1/26 200/278
5,959,517 A * 9/1999 Wieloch ................ H01H 81/04 335/16

(Continued)

FOREIGN PATENT DOCUMENTS

DE 102013114305 A1 6/2015
DE 102018204014 A1 9/2019

(Continued)

OTHER PUBLICATIONS

Germany's Office Action, Application No. 102021128179.2, Dated: May 19, 2022, 6 pages.

(Continued)

*Primary Examiner* — Felix O Figueroa
(74) *Attorney, Agent, or Firm* — Barley Snyder

(57) ABSTRACT

A switching contact assembly for an electrical switching element includes a contact bridge, a base, and a spring assembly. The contact bridge is attached to the base with the spring assembly between the contact bridge and the base. The contact bridge attached to the base is resilient in a direction opposite a switching direction.

20 Claims, 3 Drawing Sheets

(56) References Cited

U.S. PATENT DOCUMENTS

| | | | | |
|---|---|---|---|---|
| 9,269,507 | B2 * | 2/2016 | Enomoto | H01H 1/54 |
| 9,449,767 | B2 * | 9/2016 | Haehnel | H01H 1/2008 |
| 9,704,683 | B2 * | 7/2017 | Schmelz | H01H 50/20 |
| 9,978,537 | B2 * | 5/2018 | Kroeker | H01H 1/26 |
| 10,049,827 | B2 * | 8/2018 | Thar | H01H 1/20 |
| 2005/0219019 | A1 * | 10/2005 | Braun | H01H 51/065 335/126 |
| 2019/0287747 | A1 | 9/2019 | Kroeker et al. | |
| 2020/0243291 | A1 | 7/2020 | Ito | |

FOREIGN PATENT DOCUMENTS

| | | | |
|---|---|---|---|
| JP | 2019160797 | A | 9/2019 |
| WO | 2013087097 | A1 | 6/2013 |

OTHER PUBLICATIONS

Japanese Office Action dated Dec. 5, 2023 with English translation, corresponding to Application No. 2022-1701368, 8 pages.

* cited by examiner

SWITCHING CONTACT ASSEMBLY FOR AN ELECTRICAL SWITCHING ELEMENT AND ELECTRICAL SWITCHING ELEMENT

CROSS-REFERENCE TO RELATED APPLICATION

This application claims the benefit of the filing date under 35 U.S.C. § 119(a)-(d) of German Patent Application No. 102021128179.2, filed on Oct. 28, 2021.

FIELD OF THE INVENTION

The invention relates to a switching contact assembly for an electrical switching element, such as a contactor or a relay, and an electrical switching element.

BACKGROUND

In switching contact assemblies and electrical switching elements, an overtravel spring is generally used to ensure reliable contacting of a contact bridge with mating contacts.

In an attempt to downsize electrical switching elements, it is necessary to make the switching contact assemblies smaller as well. However, downsizing the overtravel spring is a problem. With smaller overtravel springs, it is difficult or impossible to precisely adjust the spring force with which the contact bridge is pressed against mating contacts, because existing overtravel springs have relatively high tolerances for the spring force that can be generated per spring length.

SUMMARY

A switching contact assembly for an electrical switching element includes a contact bridge, a base, and a spring assembly. The contact bridge is attached to the base with the spring assembly between the contact bridge and the base. The contact bridge attached to the base is resilient in a direction opposite a switching direction.

BRIEF DESCRIPTION OF THE DRAWINGS

The invention will now be described by way of example with reference to the accompanying Figures, of which.

DETAILED DESCRIPTION OF THE EMBODIMENT(S)

The invention shall be further explained hereafter on the basis of an embodiment with reference to the figures. Individual features that are advantageous by themselves can be added or omitted in the embodiment described.

Figure 1:
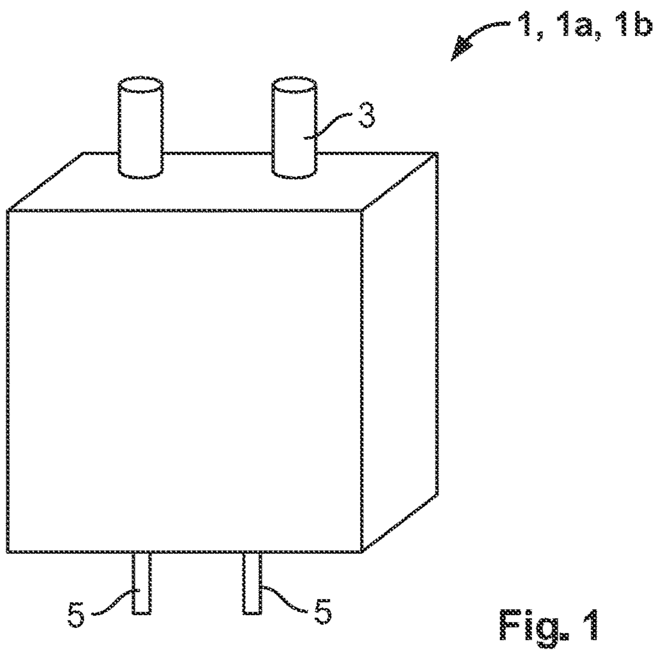
FIG. 1 is a perspective view of an electrical switching element.

FIG. 1 shows an electrical switching element 1 in a schematic representation. The electrical switching element 1 can be a relay 1*a* or a contactor 1*b*. The electrical switching element 1 comprises power contacts 3 and drive contacts 5, wherein it is possible for power contacts 3 to be switched by way of drive contacts 5.

The representation shown is purely by way of example and other configurations of electrical switching element 1 can have a different number of power contacts 3 and drive contacts 5 and/or different positioning of the power contacts 3 and drive contacts 5. The power contacts 3 can be configured as fixed contacts 3 permanently installed in switching element 1 and immovable. The drive contacts 5 can be configured as a plurality of coil terminals 5 which can be connected to a drive, e.g. a coil of switching element 1.

Figure 2:
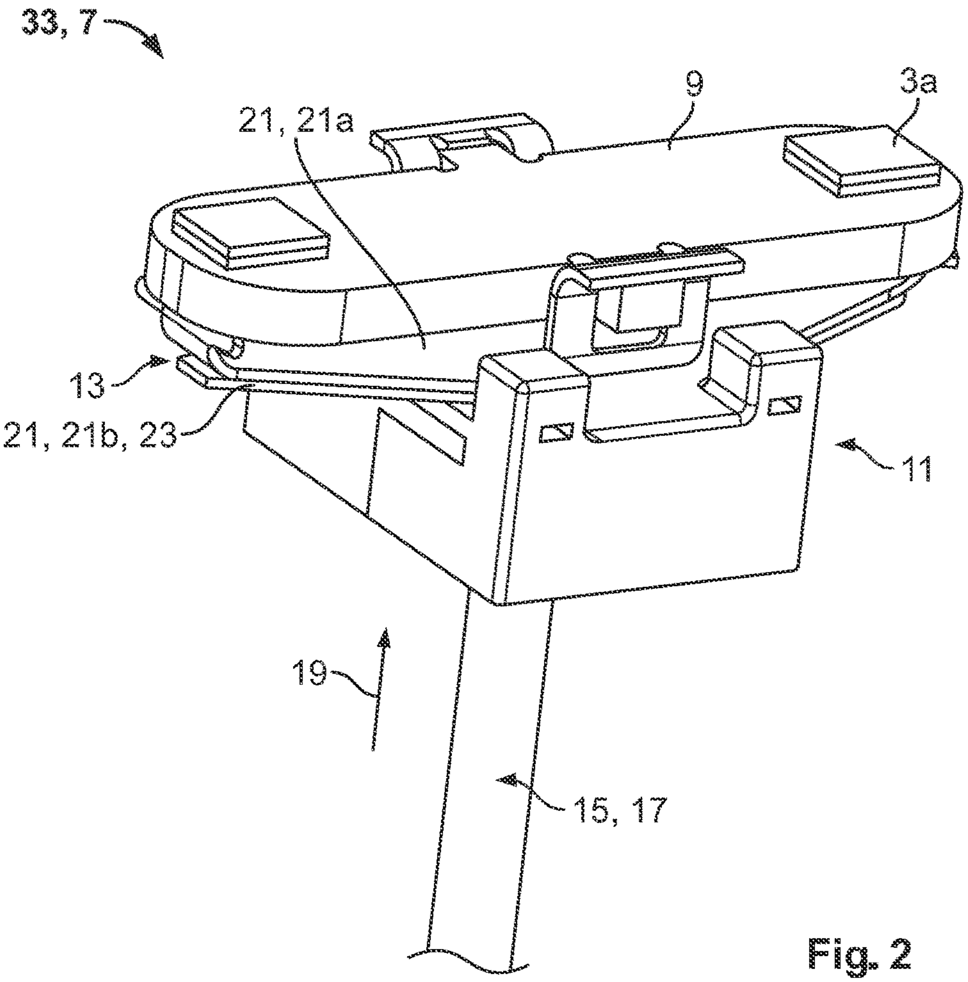
FIG. 2 is a perspective view of a switching contact assembly according to an embodiment.

A switching contact assembly 7 for switching the power contacts 3, which is shown in FIG. 2, is disposed in electrical switching element 1. In addition to the switching contact assembly 7, the electrical switching element 1 has a drive.

As shown in FIG. 2, the switching contact assembly 7 comprises a contact bridge 9, a base 11, and a spring assembly 13. Contact bridge 9 comprises mating power contacts 3*a* which, when switching contact assembly 7 is actuated, i.e. when moving along a switching direction 19, switch power contacts 3 (see FIG. 1), i.e. electrically connect them with one another by way of contact bridge 9. Mating power contacts 3*a* can therefore be configured as movable contacts 3*a* which are movable relative to fixed contacts 3.

The base 11 can consist of electrically non-conductive material and can therefore represent a galvanic isolation. In an embodiment, the contact bridge 9 can be galvanically isolated from other elements.

Contact bridge 9 is furthermore attached to base 11 by way of spring assembly 13. An actuating element 17 extending along an axis 15 is likewise attached to base 11, as shown in FIG. 2, and allows switching contact assembly 7 to be actuated/moved in the switching direction 19. Contact bridge 9 is attached to base 11 in a manner resilient in switching direction 19. Contact bridge 9 is attached to base 11 also in the direction opposite to switching direction 19, which shall be discussed in the following figures.

Figure 3:
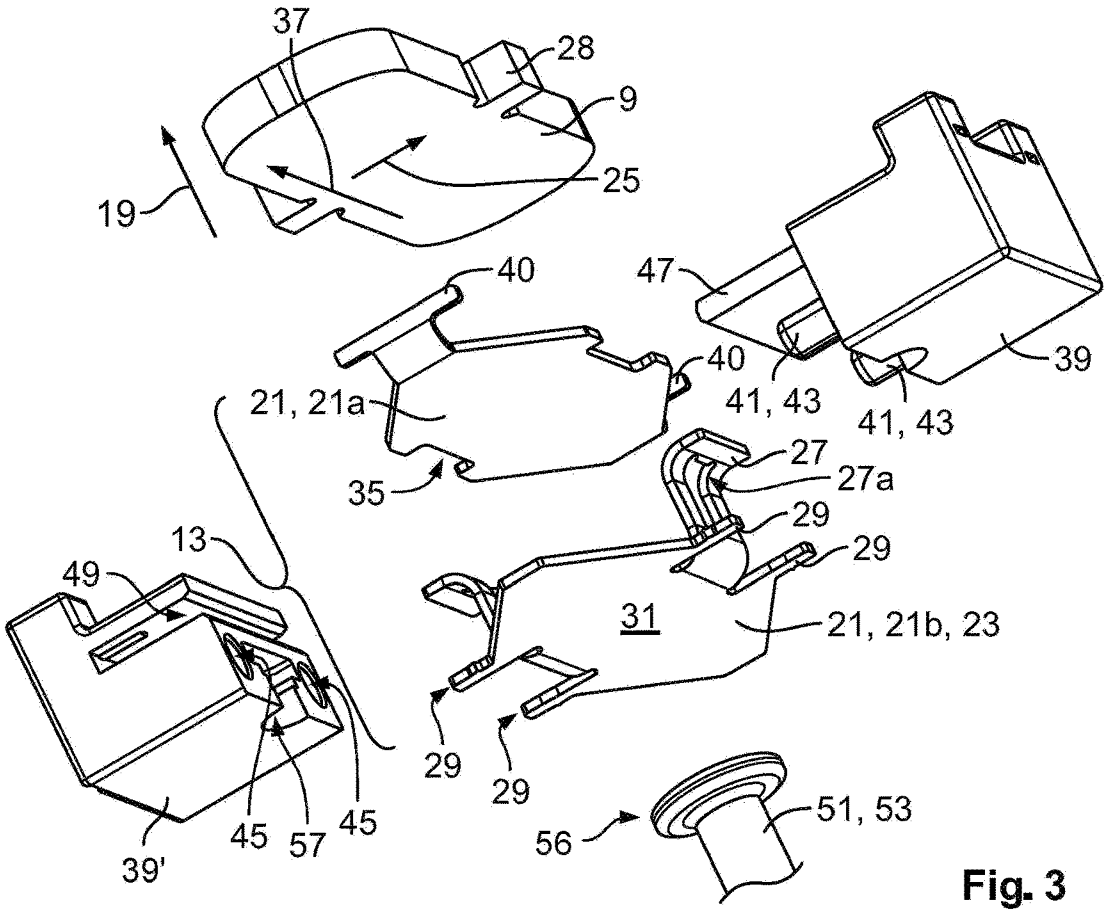
FIG. 3 is an exploded perspective view of the switching contact assembly of FIG. 2.

In the embodiment shown, spring assembly 13 of switching contact assembly 7 comprises two spring elements 21 bearing directly against one another. A first spring element 21*a* of spring assembly 13 is inserted into a second spring element 21*b* of spring assembly 13, as shown in FIGS. 2 and 3. The spring elements 21*a*, 21*b* can have the same or different spring constant and/or spring stroke. These can have a smaller installation space than spiral springs for the same spring force, at least along the spring direction, which presently corresponds to the switching direction. In addition, a spring assembly 13 can generate a predetermined spring force within tighter tolerances than a spiral spring while having the same spring length. The spring assembly 13 can be configured as an elliptical spring.

A spring element 21, second spring element 21*b* of spring assembly 13 in the embodiment shown, is configured as a contact bridge retainer 23. Contact bridge retainer 23 holds contact bridge 9 at base 11. Various devices can be used to attach the second spring element 21*b* to the base 11. Purely by way of example, the second spring element 21*b* can be clipped on, adhesively bonded, riveted or screwed on.

Another spring element, first spring element 21*a* of spring assembly 13 in the embodiment shown, is arranged between contact bridge retainer 23 and contact bridge 9. The first spring element 21*a* and/or the second spring element 21*b*, i.e. also the contact bridge 9, can be a punched and bent part, i.e. manufactured to be punched out of sheet metal.

The spring assembly 13 can also be formed by more than two spring elements that bear directly against one another. The spring force of the spring assembly 13 can be scaled with the number of spring elements.

The spring elements 21*a*, 21*b* can be deflectable away from the contact bridge 9. Two symmetrical spring legs may be provided for every spring element 21*a*, 21*b* and can be deflectable symmetrically. In particular, the at least two spring elements 21*a*, 21*b* can each bear directly against one another with their central region or section. The spring elements 21*a*, 21*b* can bear entirely directly against one another along a longitudinal extension. The longitudinal extension of a spring element 21*a*, 21*b* or the contact bridge 9 corresponds to a direction that lies in a plane that is spanned by the deflecting spring assembly. Accordingly, a transverse direction can be defined which can be defined to be perpendicular to this plane spanned by the deflecting spring assembly 13.

The second spring element 21*b* can have a configuration that is similar to a cage or can form a cage in which the first spring element 21*a* is received. The first spring element 21*a* can be received in a positive-fit manner in the second spring element 21*b*. The first spring element 21*a* may be received loosely in the second spring element 21*b* and can therefore be detached therefrom. If the first spring element 21*a* is received in the second spring element 21*b* in a positive-fit manner, the positive-fit connection be established in particular along the longitudinal extension of the spring assembly 13. The second spring element 21*b* can also be received in the first spring element 21*a* in a positive-fit manner in a motion relative to the first spring element 21*a* in and in a direction opposite to the transverse direction. For this purpose, the second spring element 21*b* can have a cross section that is U-shaped, at least in sections, when viewed in the longitudinal extension.

A region of the first or the second spring element 21*a*, 21*b*, around which the respective spring legs can be deflected or deflect in or in a direction opposite to the switching direction 19, can be regarded to be the bending axis. The bending axis can therefore be formed by a volume area of the first and/or the second spring element 21*a*, 21*b* and not just denote a (one-dimensional) line.

As shown in the exploded drawing of switching contact assembly 7 according to the invention in FIG. 3, contact bridge retainer 23 comprises two contact bridge retaining legs 27 which are spaced apart from one another in a transverse direction 25 of contact bridge 9 that is oriented to be transverse to switching direction 19. Contact bridge 9 is attached to contact bridge retainer 23 by way of contact bridge retaining legs 27. The contact bridge retaining legs 27 extend away from a central region of the second spring element 21*b* configured as a contact bridge retainer 23 and can be bent in the switching direction 19 away from the central region.

Contact bridge retaining legs 27 form a lug 27*a* in which a post 28 of contact bridge 9 is received. This prevents a further motion of contact bridge 9 in switching direction 19. The contact bridge retaining legs 27 can then each represent a mechanical stop for the contact bridge 9. The contact bridge 9 is held to be movable up to this stop. In a state of rest of the spring assembly, the posts 28 of the contact bridge 9 can bear against the stops.

When the spring assembly 13 is at rest, it can be preloaded. Contact bridge 9 is supported by spring assembly 13 in the direction opposite to switching direction 19. The contact bridge retaining legs 27 can be oriented parallel to the switching direction 19 and face each other along the transverse direction 25.

As shown in FIG. 3, contact bridge retainer 23 comprises four attachment projections 29 for attaching it to base 11. Attachment projections 29 extend from a central region 31 of contact bridge retainer 23 in or in a direction opposite to transverse direction 25. One contact bridge retaining leg 27 each is located between two attachment projections 29. Contact bridge retaining leg 27 is bent substantially in switching direction 19.

The attachment projections 29 can be, for example, lugs that are punched out and particularly extend to be perpendicular to the switching direction 19. The second spring element 21*b* configured as a contact bridge retainer 23 can then be connected to the base 11 and at the same time the first spring element 21*a* can be inserted (in a positive-fit manner) into the second spring element 21*b*. The attachment projections 29 can be provided in pairs, but switching contact assemblies with an odd number of attachment projections 29 are also conceivable.

The orientation of the attachment projections 29 may be perpendicular to the switching direction 19, so that a spring force of the spring assembly 13 acting in the switching direction 19 acts perpendicular to the attachment of the second spring element 21*b* to the base 11 by way of attachment projections 29. This has the advantage that, when the switching contact assembly 13 is actuated in the switching direction 19, precisely the connection between the second spring element 21*b* and the base 11 cannot be released at the base 11.

The bending axis can extend between two attachment projections 29 so that the deflecting spring legs are mounted in that region of those spring elements 21*a*, 21*b* that also comprises the bending axis. This has the advantage that the attachment of the second spring element 21*b* to the base 11 and therefore the spring assembly 13 to the base 11 is not or only slightly stressed by a deflection of the spring assembly 13. If the bending axis and an axis of the attachment are not disposed on top of one another or close together, then the deflection of a spring leg of the first or the second spring element 21*a*, 21*b* can lead to an excessive force being applied to the attachment axis, since, if the bending axis and the attachment axis are spatially separated, a lever with two lever arms can form and a force acting at the spring leg force can be increased. This can mechanically stress the attachment of the spring assembly 13 to the base 11 or even lead to a defect in the attachment (for example, the attachment projections breaking out of the attachment openings).

In an assembled state 33, shown in FIG. 2, first spring element 21*a* is received in second spring element 21*b* that is configured as a contact bridge retainer 23, in that both contact bridge retaining legs 27 of contact bridge retainer 23 are each disposed in a recess 35 of first spring element 21*a*. This prevents a relative motion of first spring element 21*a* against contact bridge retainer 23 along a longitudinal direction 37. Furthermore, such a relative motion in transverse direction 25 is blocked by the reception of contact bridge retaining legs 27 in recesses 35.

In switching direction 19, first spring element 21*a* is supported on contact bridge 9 at two mounting points 40 in a manner resilient in a direction opposite to switching direction 19.

Entire spring assembly 13 is therefore supported in a resilient manner on contact bridge 9 by way of mounting points 40, wherein a motion of contact bridge 9 in switching direction 19 is restricted by contact bridge retaining legs 27 configured as lugs 27*a*. Such a mounting point 40 for the contact bridge 9 can be located at each end of the contact bridge 9 located in and opposite to the longitudinal direction. The mounting points 40 can be punctiform or linear, wherein the linear form is may cause less wear as compared to punctiform contact, and the mounting point 40 of the first spring element 21*a* is not pressed into the material of the contact bridge 9 even after a large number of switching cycles.

Each mounting point 40 provided by the first spring element 21*a* can mount the contact bridge 9 in a resilient manner independently of other mounting points 40 by way of a spring leg or several spring legs forming a spring leg assembly. Two mounting points 40 may be provided, while three mounting points 40 are also conceivable.

When switching contact assembly 7 strikes with mating power contacts 3*a* in switching direction 19 against power contacts 3, contact bridge 9 moves towards base 11, wherein this motion is guided by posts 28 sliding in lugs 27*a* in a direction opposite to switching direction 19. In the process, spring assembly 13 is deflected in a direction opposite to switching direction 19.

As shown in FIG. 3, base 11 of switching contact assembly 7 is assembled from two parts 39, 39'. A first part 39 comprises positioning elements 41. In the embodiment shown, they are configured as positioning pins 43 and are used to position the two parts 39 of base 11 relative to one another and to attach the at least two parts 39, 39' of base 11. The positioning elements 41 can have different cross sections, for example round, square or trilobular (triangular). For this purpose, positioning pins 43 are inserted into corresponding positioning openings 45 of a second part 39'. The base 11 can also be configured such that it can be assembled from three or more parts 39, wherein at least two parts create the positive-fit connection between the base 11 and the spring assembly 13 when being assembled. The positioning elements 41 can be separate elements (similar to a dowel) but are monolithically connected to one of the at least two parts 39 of the base 11.

The first part 39 of base 11 comprises a projection 47 which is oriented to be substantially perpendicular to switching direction 19. Second part 39' comprises a recess which is oriented to be substantially perpendicular to switching direction 19 and which is referred to as a further recess 49 to distinguish it from recess 35 in first spring element 21*a*.

Figure 4:
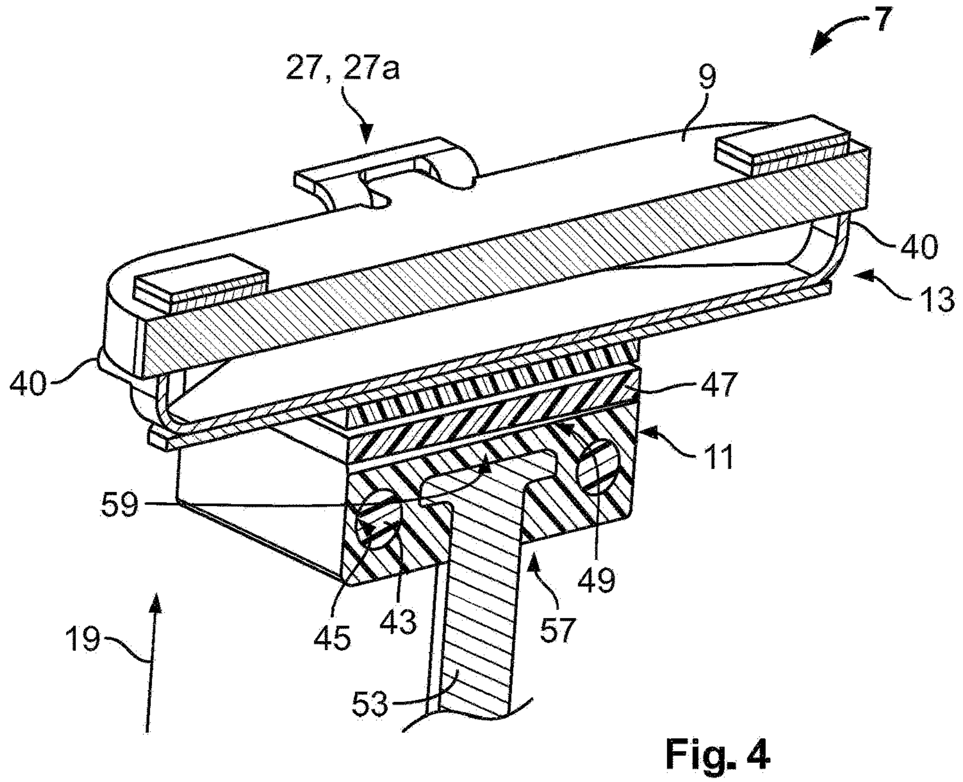
FIG. 4 is a sectional perspective view of the switching contact assembly of FIG. 2.

In assembled state 33, projection 47 engages in further recess 49, as shown in FIG. 4. Firstly, this serves to connect two parts 39, 39' as well as, secondly, to increase a creepage distance between spring assembly 13 (it is electrically connected to contact bridge 9) and an actuating element 53 configured as an axis 51.

A disk-shaped head 56 of actuating element 53 is inserted into corresponding axis receptacles 57 of parts 39, 39', wherein in assembled state 33 of base 11, a positive-fit connection forms between axis receptacles 57 and actuating element 53. Actuating element 53 is held by base 11, as shown in FIG. 4.

FIG. 4 shows switching contact assembly 7 according to the invention in a sectional view. It can be seen that positioning pins 43 are inserted into corresponding positioning openings 45 and projection 47 is inserted into further recess 49. A positive-fit connection 59 is formed between axis receptacles 57 and actuating element 53.

Contact bridge 9 is supported by way of spring assembly 13 in a resilient manner against base 11, wherein spring assembly 13 is supported by two mounting points 40 on contact bridge 9 and a motion of contact bridge 9 in switching direction 19 is restricted by contact bridge retaining leg 27 that is configured as a lug 27*a*.

Figure 5:
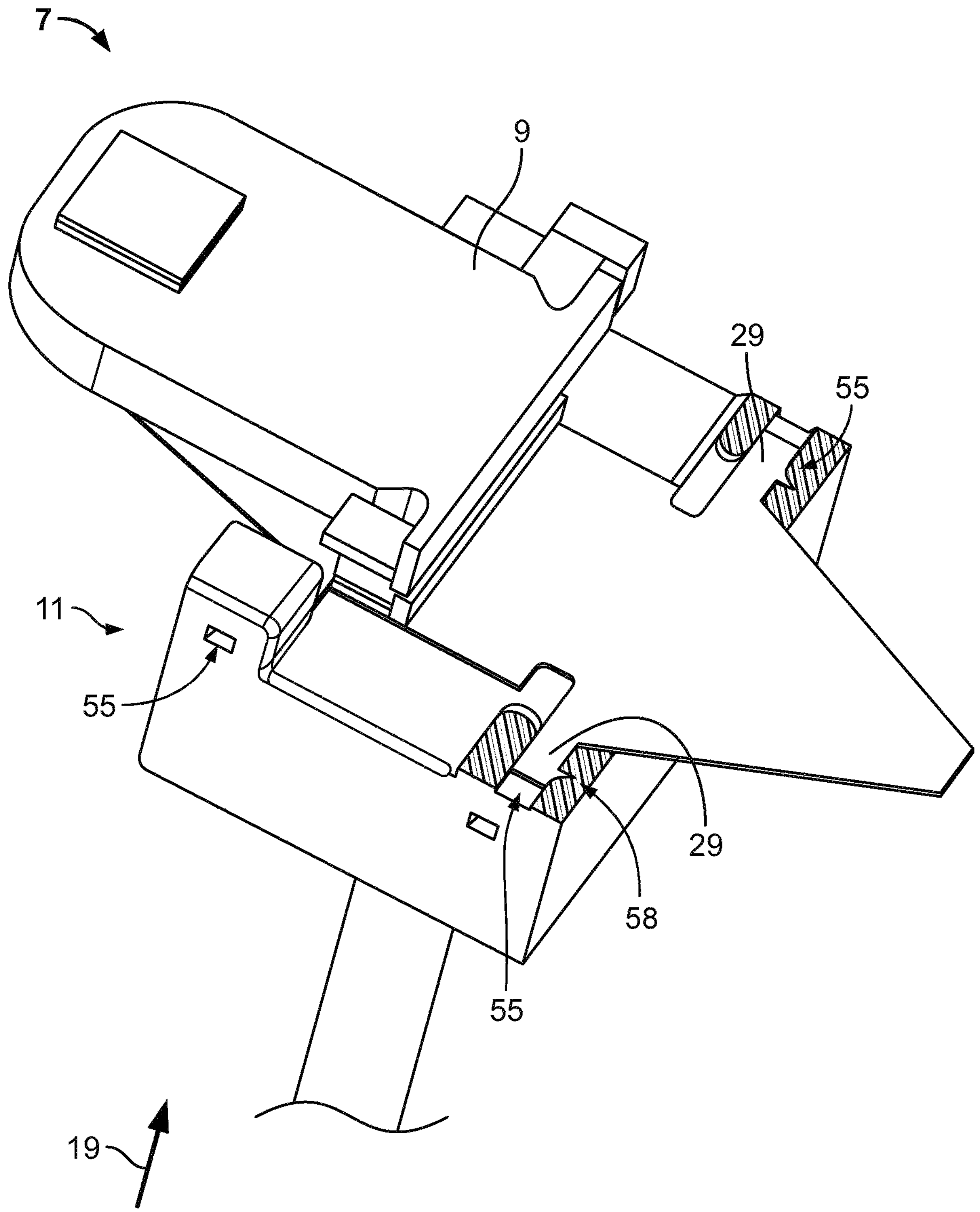
FIG. 5 is a sectional perspective view of the switching contact assembly of FIG. 2.

FIG. 5 shows switching contact assembly 7 according to the invention in a partially sectioned view. Base 11 is shown there in assembled state 33, in which two of four attachment projections 29 can be seen. Attachment projections 29 are received in attachment openings 55 that are provided by each part 39. Attachment projections 29 require no additional tools to insert them into corresponding openings in the base 11. Such attachment openings 55 of the base 11 can be configured to be complementary to the cross section of the attachment projections 29. The base 11 can be made of a plastic material or can comprise at least one plastic material. 58

Furthermore, attachment projections 29 comprise latching and/or barbed hooks 58 with which they are attached in attachment openings 55. The latching and/or barbed hooks 58 can displace the material on the inside of the attachment opening 55 and engage in the material of the attachment opening 55. The at least one latching and/or barbed hook 58 of the attachment projection 29 can then prevent the attachment projection 29 from being able to be removed from the attachment opening 55. The plugging process can therefore be non-reversible.

The attachment of contact bridge 9 to base 11 is therefore perpendicular to switching direction 19. When switching contact assembly 7 is actuated, the connection between attachment projections 29 and base 11 can therefore be prevented from detaching.

The switching contact assembly 7 and electrical switching element 1 which ensure a sufficiently high and sufficiently precisely adjustable spring force in the smallest possible installation space.

What is claimed is:

1. An electrical switching element, comprising:

a switching contact assembly including a contact bridge having a pair of posts protruding from the contact bridge, a base, and a spring assembly, the contact bridge is attached to the base with the spring assembly between the contact bridge and the base, the contact bridge attached to the base is resilient in a direction opposite a switching direction, the spring assembly includes a pair of spring elements bearing directly against one another, a first spring element of the spring assembly is inserted into a second spring element of the spring assembly, the second spring element is a contact bridge retainer holding the contact bridge, the contact bridge retainer has a central region that is planar and a pair of contact bridge retaining legs extending from the central region in the switching direction, the contact bridge retaining legs are spaced apart from one another in a transverse direction of the contact bridge that is transverse to the switching direction, each of the posts is received in a lug of one of the contact bridge retaining legs, the contact bridge is movable with respect to the contact bridge retainer along the switching direction with the posts movable within the contact bridge retaining legs, the first spring element is a sheet metal that has a planar region parallel to the central region of the contact bridge retainer and abutting the central region of the contact bridge retainer, the first spring element has a pair of mounting points at opposite ends that extend in the switching direction, the first spring element bears against the contact bridge in a manner resilient in the direction opposite the switching direction only at the mounting points.

2. The electrical switching element of claim 1, wherein the electrical switching element is a relay or a contactor.

3. A switching contact assembly for an electrical switching element, comprising:

a contact bridge having a pair of posts protruding from the contact bridge;

a base; and a spring assembly, the contact bridge is attached to the base with the spring assembly between the contact bridge and the base, the contact bridge attached to the base is resilient in a direction opposite a switching direction, the spring assembly includes a pair of spring elements bearing directly against one another, a first spring element of the spring assembly is inserted into a second spring element of the spring assembly, the second spring element is a contact bridge retainer holding the contact bridge, the contact bridge retainer has a central region that is planar and a pair of contact bridge retaining legs extending from the central region in the switching direction, the contact bridge retaining legs are spaced apart from one another in a transverse direction of the contact bridge that is transverse to the switching direction, each of the posts is received in a lug of one of the contact bridge retaining legs, the contact bridge is movable with respect to the contact bridge retainer along the switching direction with the posts movable within the contact bridge retaining legs, the first spring element is a sheet metal that has a planar region parallel to the central region of the contact bridge retainer and abutting the central region of the contact bridge retainer, the first spring element has a pair of mounting points at opposite ends that extend in the switching direction, the first spring element bears against the contact bridge in a manner resilient in the direction opposite the switching direction only at the mounting points.

4. The switching contact assembly of claim 3, wherein the contact bridge retaining legs are each a mechanical stop for movement of the contact bridge along the switching direction.

5. The switching contact assembly of claim 3, wherein the posts bear against the contact bridge retaining legs in a state of rest of the spring assembly.

6. The switching contact assembly of claim 3, wherein the contact bridge retaining legs are each disposed in a recess of the planar region of the first spring element.

7. The switching contact assembly of claim 3, wherein the contact bridge is held on the contact bridge retaining legs of the contact bridge retainer.

8. The switching contact assembly of claim 3, wherein the contact bridge retainer is attached to the base.

9. The switching contact assembly of claim 3, wherein the base is assembled from a pair of parts.

10. The switching contact assembly of claim 8, wherein the contact bridge retainer has a pair of attachment projections attaching to the base.

11. The switching contact assembly of claim 10, wherein the contact bridge retainer has a contact bridge retaining leg disposed between the attachment projections.

12. The switching contact assembly of claim 9, wherein each of the pair of parts is formed of an insulative material.

13. The switching contact assembly of claim 9, wherein the pair of parts form a positive-fit connection when assembled and hold the spring assembly.

14. The switching contact assembly of claim 13, wherein the base has a plurality of positioning elements positioning the pair of parts relative to one another and attaching the pair of parts to one another.

15. The switching contact assembly of claim 9, wherein the base has a receptacle for an actuating element that is disposed on a side of the base opposite the spring assembly.

16. The switching contact assembly of claim 15, wherein the pair of parts form a positive-fit connection when assembled and hold the actuating element.

17. The switching contact assembly of claim 16, wherein the pair of parts attach the actuating element to the spring assembly.

18. The switching contact assembly of claim 9, wherein one of the parts of the base has a projection oriented perpendicular to the switching direction and the other of the parts of the base has a recess perpendicular to the switching direction.

19. The switching contact assembly of claim 18, wherein the projection and the recess engage one another when the base is in a plugged state.

20. The switching contact assembly of claim 19, wherein the switching assembly is attached to the parts of the base and the actuating element is attached to the parts of the base, the projection is between the switching assembly and the actuating element along the switching direction.

* * * * *